US012775817B1

(12) United States Patent
Polk, Jr.

(10) Patent No.: US 12,775,817 B1
(45) Date of Patent: Oct. 27, 2026

(54) STORED VALUE CARD AND CARRIER APPARATUSES AND METHODS

(71) Applicant: Comdata, Inc., Brentwood, TN (US)

(72) Inventor: James W. Polk, Jr., Georgetown, IN (US)

(73) Assignee: Comdata, Inc., Brentwood, TN (US)

( * ) Notice: Subject to any disclaimer, the term of this patent is extended or adjusted under 35 U.S.C. 154(b) by 0 days.

(21) Appl. No.: 19/199,463

(22) Filed: May 6, 2025

(51) Int. Cl.
*G06K 19/06* (2006.01)

(52) U.S. Cl.
CPC .............................. *G06K 19/06187* (2013.01)

(58) Field of Classification Search
None
See application file for complete search history.

(56) References Cited

U.S. PATENT DOCUMENTS

2022/0339955 A1* 10/2022 Dickman ............ B42D 15/045

* cited by examiner

*Primary Examiner* — Kristy A Haupt
(74) *Attorney, Agent, or Firm* — Holland & Knight LLP; Forrest S. Tinnin

(57) ABSTRACT

The present disclosure provides for a stored value card apparatus and a method of manufacturing the same. The apparatus may include an outer carrier and an inner carrier. The outer carrier may include a closed end and an open end, such that a slot is defined between the closed end and the open end. The inner carrier may be disposed in the slot. The inner carrier may include a tab fixed to the open end. The inner carrier may further include a stored value card removably secured to the tab and longitudinally extending away from the tab towards the closed end. The stored value card may have one or more activation indicia displayed thereon and covered by the outer carrier.

20 Claims, 12 Drawing Sheets

STORED VALUE CARD AND CARRIER APPARATUSES AND METHODS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present invention relates generally to stored value cards. More particularly, the present invention relates to a stored value card and carrier system and a method of manufacturing the stored value card and carrier system wherein accessing of the activation indicia of the stored value card necessarily corresponds with destruction of at least a portion of the carrier.

Stored value cards, also referred to as pre-paid cards or gift cards, are generally known in the prior art and are used by consumers to perform financial transactions. Unlike a debit card, the monetary value is typically stored on the card itself rather than in a financial institution account.

Historically, stored value cards have been adhered to various forms of a carrier or other packaging to present the card for sale to consumers. A consumer may select a stored value card from a store display and present the card along with the carrier to a cashier. The cashier may utilize activation indicia displayed on the stored value card to activate (e.g., add value to) the card. The cashier may scan the activation indicia (e.g., where the activation indicia is a barcode), swipe the activation indicia (e.g., where the activation indicia is a magnetic strip), input the activation indicia into a check-out system (e.g., where the activation indicia is a unique code), or the like.

Fraudsters have developed processes and schemes to compromise the stored value cards. Merchants have attempted to prevent such fraud by securing the carrier around the card, thus creating an external carrier with security features and an internal security feature free area where the stored value card is located. However, these fraudsters penetrate the outside security of the carrier and reach the security feature free area where the store value card is located. Once the fraudster has reached this security feature free area, they remove the card, capture information, or manipulate the card, and return the card to the carrier. The compromised stored value card is then sold to an unsuspecting consumer who becomes the victim of the fraud through the loss of funds on the card.

Accordingly, a need exists for improvements in stored value card and carrier systems wherein removing the stored value card from the carrier destroys the carrier and thus provides a visual clue that the carrier has been tampered with prior to purchase.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a stored value card and carrier apparatus. The apparatus may include an outer carrier and an inner carrier. The outer carrier may include a closed end and an open end. In some embodiments, the outer carrier defines a slot between the closed end and the open end. For example, the outer carrier may include a first panel and a second panel vertically disposed above the first panel. The first panel and the second panel may be fixed together at the closed end of the outer carrier, and the open end may be defined longitudinally opposite the closed end.

The apparatus may further include an inner carrier disposed in the slot. The inner carrier may include a tab fixed to the open end. For example, the tab may be considered a third panel longitudinally disposed on the open end. The first panel may include a first inner side, and the second panel may include a second inner side. Thus, the tab may be fixed to each of the first inner side and the second inner side. The inner carrier may further include a stored value card removably secured to the tab. The stored value card may longitudinally extend away from the tab towards the closed end. The stored value card may have one or more activation indicia displayed thereon and covered by the outer carrier.

In some embodiments, the closed end is formed by a first permanent adhesive. For example, the first inner side may be fixed to the second inner side via the first permanent adhesive. In some embodiments, the tab is fixed to the first inner side via a second permanent adhesive, and the tab is fixed to the second inner side via a third permanent adhesive.

In some embodiments, the stored value card is removably secured to the tab via a scored edge formed between the stored value card and the tab. Depending on the implementation, the stored value card may be removably secured to one or more of the first inner side and the second inner side. As a first example, the stored value card may be removably adhered to the first inner side via a first temporary glue. As a second example, the stored value card may be removably adhered to the second inner side via a second temporary glue.

Another aspect of the present disclosure is a method of manufacturing a stored value card and carrier apparatus. The method may include providing the aforementioned inner carrier and vertically situating the inner carrier in the slot. For example, the inner carrier may be vertically situated above the first panel and below the second panel. The method may further include forming the closed end of the outer carrier. For example, the first inner side of the first panel may be fixed to the second inner side of the second panel (e.g., via the first permanent adhesive). Thus, the open end of the outer carrier may be formed longitudinally opposite the closed end. The method may further include fixing the tab of the inner carrier to each of the first inner side and the second inner side at the open end. As suggested above, the tab may be removably secured to the stored value card such that the stored value card longitudinally extends away from the closed end and the one or more activation indicia are covered by the outer carrier. The method may further include removably adhering the stored value card to the outer carrier as discussed above.

Numerous other objects, advantages and features of the present disclosure will be readily apparent to those of skill in the art upon a review of the following drawings and description of a preferred embodiment.

DETAILED DESCRIPTION

Figure 1:
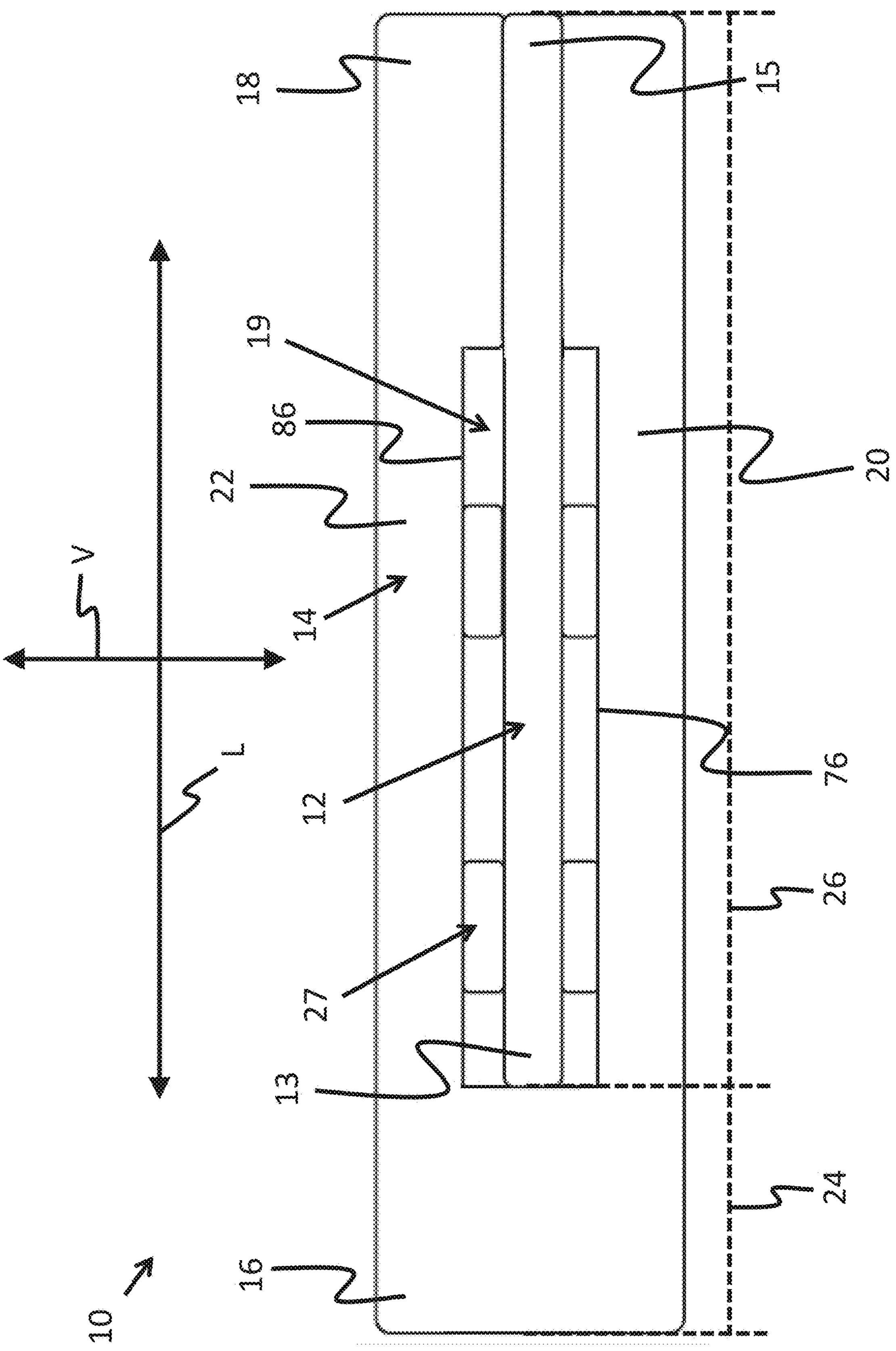
FIG. 1 is a side view of a stored value card and carrier apparatus, according to some embodiments of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring now to FIG. 1, a stored value card and carrier apparatus ("apparatus") 10 is shown, according to some embodiments of the present disclosure. The apparatus 10 may include an inner carrier 12 and an outer carrier 14. As discussed herein, the outer carrier 14 may be considered outer packaging for the apparatus 10. As discussed in greater detail below, the inner carrier 12 may include a stored value card ("card") 28 (e.g., a gift card) and additional packaging, such that the inner carrier 12 may be considered a card and inner packaging for the apparatus 10.

The outer carrier 14 may generally extend longitudinally in either direction along a longitudinal reference axis L of the apparatus 10. Thus, the outer carrier 14 may include a first longitudinal end and a second longitudinal end. As discussed in greater detail below, such longitudinal ends may be a closed end 16 and an open end 18 longitudinally opposite the closed end 16 relative to the longitudinal reference axis L.

The outer carrier 14 may further extend vertically in either direction along a vertical reference axis V of the apparatus 10. Accordingly, the outer carrier 14 may further include a lower side 20 extending between the closed and open ends 16,18, and a upper side 22 extending between the closed and open ends 16, 18.

In some embodiments, the outer carrier 14 defines a slot 19 between (e.g., longitudinally extending between) the closed end 16 and the open end 18. The inner carrier 12 may be disposed in the slot 19. In other words, the inner carrier 12 may be disposed between the first and second sides 20, 22 of the outer carrier 14.

The inner carrier 12 may include a first longitudinal end 13 and a second longitudinal end 15 opposite the first longitudinal end 13. As shown, the first longitudinal end 13 may be longitudinally closer to the closed end 16 of the outer carrier 14 than the second longitudinal end 15, and the second longitudinal end 15 may be longitudinally closer to the open end 18 of the outer carrier 14 than the first longitudinal end 13.

In some embodiments, the closed end 16 of the outer carrier 14 wraps around (e.g., vertically circumvents) the first longitudinal end 13 of the inner carrier 12, while the second longitudinal end 15 of the inner carrier 12 extends to meet the open end 18 of the outer carrier 14. In this sense, the outer carrier 14 may be longer (e.g., have a greater longitudinal length along the longitudinal reference axis L) than the inner carrier 12. In other embodiments, the second longitudinal end 15 of the inner carrier 12 and the open end 18 of the outer carrier 14 are offset by some longitudinal distance. As shown, the inner carrier 12 may be received in the slot 19 formed by the outer carrier 14.

The closed end 16 of the outer carrier 14 may wrap around the first longitudinal end 13 of the inner carrier 12, while the outer carrier 14 may be separated between the first and second sides 20, 22 at the open end 18. Accordingly, the outer carrier 14 may include a closed portion 24 (along the longitudinal reference axis L) where the first and second sides 20, 22 are joined in order to wrap around the first longitudinal end 13 of the inner carrier 12, and a open portion 26 longitudinally spanning (along the longitudinal reference axis L) from the open end 18 to the closed portion 24.

The first and second sides 20, 22 may be separated along the open portion 26 in order to receive the inner carrier 12 in the slot 19 as mentioned above. Thus, the inner carrier 12 may be positioned in between the first and second sides 20, 22 along the open portion 26. As discussed in greater detail below, the apparatus 10 may include one or more adhesives 27 disposed in the slot 19 in order to removably adhere the card 28 of the inner carrier 12 to the first and second sides 20, 22 of the outer carrier 14.

In some embodiments, the outer carrier 14 includes a first inner side 76 and a second inner side 86 below the first inner side 76. For example, at least a portion of the first and second inner sides 76, 86 may form the bottom and top (respectively) of the slot 19.

As discussed in greater detail below, the inner carrier 28 may further include a tab 30 removably secured to the card 28. The tab 30 may be fixed to each of the first inner side 76 and the second inner side 86. Furthermore, as suggested above, the card 28 may removably adhered to the first and second inner sides 76, 86 (e.g., via the one or more adhesives 27).

Figure 2:
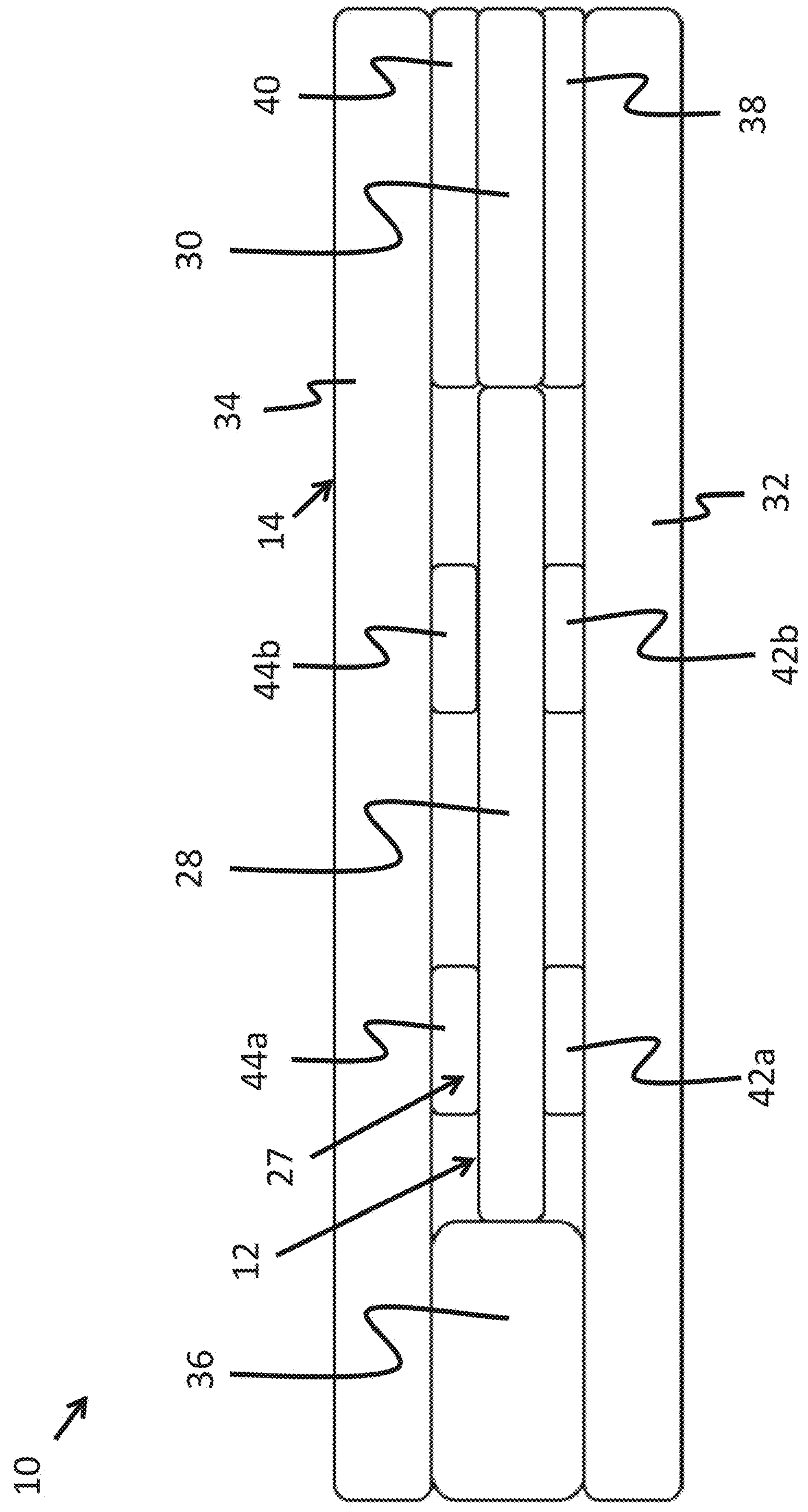
FIG. 2 is a side view of a stored value card and carrier apparatus, according to other embodiments of the present disclosure.

Referring now to FIG. 2, the apparatus 10 is shown in greater detail, according to some embodiments of the present disclosure. As suggested above and shown, the inner carrier 12 may include the card 28 and the tab 30.

As mentioned above, the outer carrier 14 may be considered outer packaging for the apparatus 10. In some embodiments, the outer carrier 14 includes a first panel 32 and a second panel 34 vertically disposed (e.g., relative to the vertical reference axis V depicted with reference to FIG. 1) above the first panel 32. In this sense, the first panel 32 may be positioned on the lower side 20 of the outer carrier 14, and the second panel 34 may be positioned on the second side 22 of the outer carrier 14.

As mentioned above, the inner carrier 12 may include the tab 30. Depending on the implementation, the tab 30 as discussed herein may be considered a "third panel" 30. As discussed in greater detail below, the tab 30 may be fixed to the outer carrier 14 at the open end 18 of the outer carrier 14. For example, the tab 30 may be fixed to the first and second inner sides 76, 86 of the outer carrier at the open end 18 of the outer carrier 14, thus providing a closure at the open end 18 of the outer carrier 14.

As mentioned above, the outer carrier 14 may include the first and second inner sides 76, 86. Depending on the implementation, the first panel 32 may define, and thus include, the first inner side 76, and the second panel 34 may define, and thus include, the second inner side 86.

In some embodiments, the first panel 32 may be fixed to the second panel 34 at the closed end 16 of the outer carrier 14. In other words, the first panel 32 may be fixed to the second panel 34 along the closed portion 24 of the outer carrier 14. Accordingly, the first inner side 76 of the first panel 32 may be fixed to the second inner side 86 of the second panel 34 at the closed end 16 of the outer carrier 14.

As mentioned above, the inner carrier 12 may be disposed in the slot 19. In this sense, the inner carrier 12 may be vertically disposed (e.g., relative to the vertical reference axis V) between the first panel 32 and the second panel 34. In particular, the inner carrier 12 may be vertically disposed between the first inner side 76 and the second inner side 86. As discussed above with reference to FIG. 1, the outer carrier 14 may define the closed portion 24 and the open portion 26. From a longitudinal perspective, when the inner carrier 12 is disposed in the slot 19, the inner carrier 12 may extend along (relative to the longitudinal reference axis L) the open portion 26.

As mentioned above, the first panel 32 may be fixed to the second panel 34 at the closed end 16 (e.g., along the closed portion 24) of the outer carrier 14. In some embodiments, the outer carrier 14 further includes a first permanent adhesive 36. The first inner side 76 of the first panel 32 may be fixed to the second inner side 86 of the second panel 34 via the first permanent adhesive 36. In this sense, the first adhesive 36 may be longitudinally positioned at the closed end 16 (e.g., along the closed portion 24 of the outer carrier 14) and vertically positioned between the first and second panels 32, 34. From a vertical perspective, the first permanent adhesive 36 may generally be aligned with the inner carrier 12, which may be positioned next to the first permanent adhesive 36 on the open portion 26 of the outer carrier 14. Accordingly, once the apparatus 10 is assemble as discussed herein, the first and second panels 32, 34 may not be separated at the closed end 16 of the outer carrier 14 without presenting visual indications of damage or destruction to the outer carrier 14.

In some embodiments, the tab 30 is fixed to each of the first inner side 76 of and the second inner side 86. In other words, the tab 30 may be fixed to the first and second panels 32, 34, such that the tab 30 forms a closure at the open end 18 of the outer carrier 14.

In some embodiments, the apparatus 10 further includes a second permanent adhesive 38 and a third permanent adhesive 40. The second permanent adhesive 38 may be disposed on a lower side of the tab 30 above the first panel 32 (or, in other words, between the tab 30 and the first inner surface 76) at the open end 18 of the outer carrier 14, and the third permanent adhesive 40 may be disposed on an upper side of the tab 30 below the second panel 34 (or, in other words, between the tab 30 and the second inner surface 86) at the open end 18 of the outer carrier 14. Accordingly, the tab 30 may be fixed to the first inner side 76 of the first panel 32 via the second permanent adhesive 38, and the tab 30 may be fixed to the second inner side 86 of the second panel 34 via the third permanent adhesive 40.

In some embodiments, the card 28 is removably adhered to the first inner side 76 via a first temporary adhesive 42. In further embodiments, the card 28 is removably adhered to the second inner side 86 via a second temporary adhesive 44. As mentioned above with reference to FIG. 1, the apparatus 10 may include the one or more adhesives 27 disposed in the slot 19 in order to removably adhere the card 28 of the inner carrier 12 to the first and second sides 20, 22 of the outer carrier 14.

In some embodiments, a first portion of the one or more adhesives 27 is the first temporary adhesive 42, and a second portion of the one or more adhesives 27 is the second temporary adhesive 44. As shown, the first and/or second temporary adhesives 42, 44 may be deposited as one or more patches, such that the first temporary adhesive 42 may be provided in a first deposit 42*a* and a second deposit 42*b*, and the second temporary adhesive 44 may be provided in a first deposit 44*a* and a second deposit 44*b*.

As mentioned above, the adhesive bonding the tab 30 to the first and second inner sides 76, 86 may be a permanent glue (e.g., the second and third permanent adhesives 38, 40), while the adhesive(s) bonding the card 28 to the first and/or second inner sides 76, 86 may be temporary glue (e.g., the first and second temporary adhesives 42, 44). In this sense, once the apparatus 10 is assembled as discussed herein, neither the first panel 32 (or, in other words, the first inner side 76) nor the second panel 34 (or, in other words, the second inner side 86) may be separated at the open end 18 of the outer carrier 14 from the tab 30 without presenting visual indications of damage or destruction to the outer carrier 14. Conversely, once the card 28 is separated from the tab 30 as discussed below, the card 28 may be easily removed from the first inner side 76 and/or the second inner side 86 in order to remove the card 28 from the surrounding packaging of the apparatus 10 (e.g., the outer carrier 14). The first and second temporary adhesives 42, 44 may be considered components of the one or more internal adhesives 27 mentioned above with reference to FIG. 1.

As discussed above, the outer carrier 14 may be configured to receive and support the inner carrier 12 (e.g., in the slot 19) and, depending on the implementation, may include the first and second panels 32, 34. In some embodiments, the first and second panels 32, 34 are substantially similar in shape and size. However, depending on the implementation, the first and second panels 32, 34 may have differing shapes and sizes. In some embodiments, the first and second panels 32, 34 are generally rectangular. Generally rectangular may refer to a rectangular outline that may have slight irregularities or non-linearities such as, for example, rounded corners.

Figure 3:
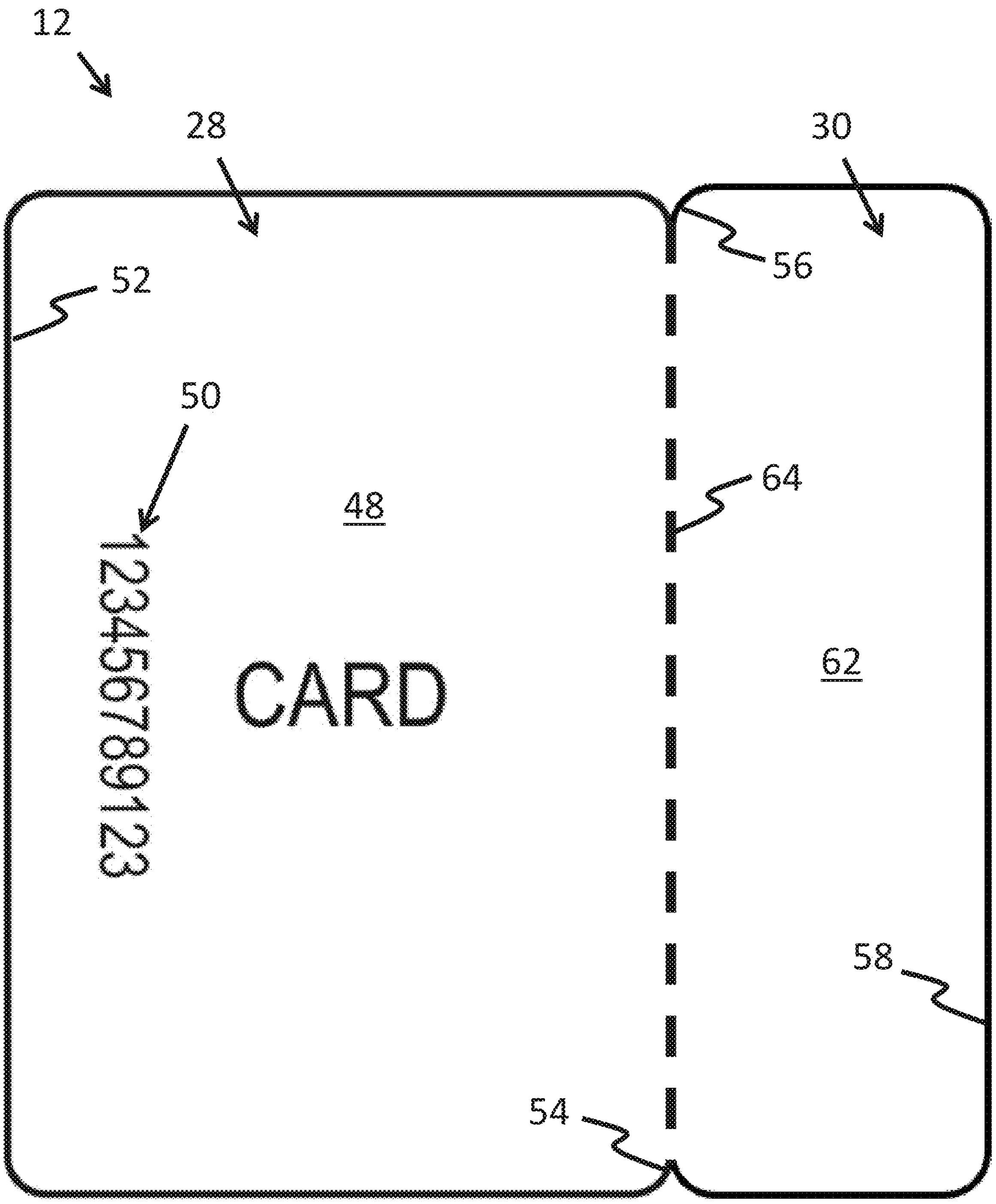
FIG. 3 is a top view of an inner carrier for a stored value card and carrier apparatus, according to some embodiments of the present disclosure.
Figure 4:
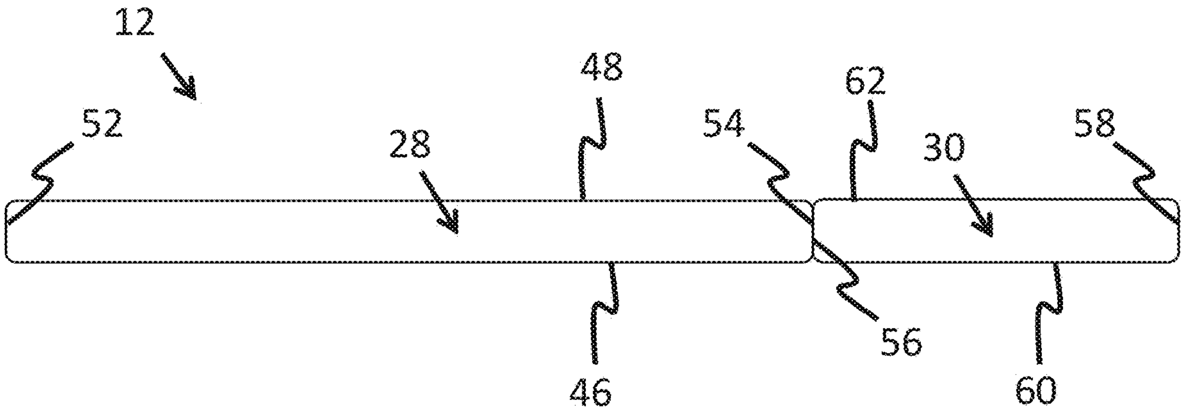
FIG. 4 is a side view of an inner carrier for a stored value card and carrier apparatus, according to some embodiments of the present disclosure.

Referring now to FIGS. 3 and 4, the inner carrier 12 is shown, according to some embodiments of the present disclosure. As mentioned above, the inner carrier 12 may include the card 28 and the tab 30. The card 28 may include a lower side 46 (shown with particular reference to FIG. 4) and an upper side 48 positioned opposite the first side 46.

As mentioned above, the card 28 may be removably adhered to the outer carrier 14 (e.g., the first and second inner sides 76, 86 of the outer carrier 14) via the first and second temporary adhesives 42, 44. Accordingly, the first temporary adhesive 42 may be disposed on the lower side 46 of the card 28, and the second temporary adhesive 44 may be disposed on the upper side 48 of the card 28.

The card 28 may include one or more activation indicia 50 displayed thereon. For instance, the one or more activation indicia 50 may be positioned on the upper side 48 of the card 28. When the apparatus 10 is assembled as discussed herein, the one or more activation indicia 50 may be covered by the outer carrier 14. In particular, the one or more activation indicia 50 may be covered by the first panel 32 or the second panel 34 of the outer carrier 14.

The one or more activation indicia 50 may include a barcode, magnetic stripe, unique code, or the like. The one or more activation indicia 50 may be displayed on the front side and/or the back side of the card 28. The card 28 may be configured to store a monetary value thereon. The card 28 may be configured in both an inactive and active state. When the card 28 is in the inactive state, the stored value card may not have a monetary value stored or otherwise associated therewith. When the card 28 is in the active state, the stored value card may have a monetary value stored or otherwise associated therewith.

In one exemplary use scenario, a consumer may present the card 28 to a cashier associated with a retail store for activation. The cashier may be required to view or otherwise interact with the one or more activation indicia 50 in order to activate the card 28. In certain exemplary embodiments, the one or more activation indicia 50 may be a barcode that the cashier scans via a reader device associated with a computer of the retail store. In other exemplary embodiments, the one or more activation indicia 50 may be a magnetic stripe that the cashier “swipes” through a reader associated with a computer of the retail store. In other exemplary embodiments, the one or more activation indicia 50 may be a unique code that the cashier manually inputs into a computer of the retail store. Thus, the card 28 may not be activated (i.e., changed from an inactive state to an active state) without viewing or otherwise interacting with the one or more activation indicia 50.

The card 28 may define a first longitudinal edge 52 and a second longitudinal edge 54 in addition to the first and sides 46, 48 mentioned above. For instance, the first longitudinal edge 52 of the card 28 may be positioned adjacent to or near the closed end 16 (or, in other words, the closed portion 24) of the outer carrier 14 when the inner carrier 12 is disposed therein (e.g., in the slot 19). Conversely, the second longitudinal edge 58 of the card 28 may be aligned with the outer edge of the open end 18 of the outer carrier 14 when the inner carrier 12 is disposed therein (e.g., in the slot 19).

The tab 30 may define a first longitudinal edge 56, a second longitudinal edge 58, a lower side 60 (shown with particular reference to FIG. 4), and an upper side 62. For instance, the second longitudinal edge 58 of the tab 30 may be positioned at the open end 18 of the outer carrier 14 when the inner carrier 12 is disposed therein.

As mentioned above, the tab 30 may be fixed to the first panel 32 (or, in other words, the first inner side 76) and the second panel 34 (or, in other words, the second inner side 86) of the outer carrier 14 via the second and third permanent adhesives 38, 40 (respectively). In this sense, the second permanent adhesive 38 may be disposed on the lower side 60 of the tab 30, and the third permanent adhesive 40 may be disposed on the upper side 62 of the tab 30.

In some embodiments, the card 28 and the tab 30 are formed in a single sheet of material. However, the card 28 may be removably secured to the tab 30. For example, the second longitudinal edge 54 of the card 28 and the first longitudinal edge 56 of the tab 30 may be defined along a common fold line 64 formed in the single sheet of material. In other embodiments, the card 28 and the tab 30 are formed from two separate sheets of material.

In some embodiments, the card 28 is removably secured to the tab 30 via a scored edge formed between the card 28 and the tab 30. In other embodiments, the card 28 is removably secured to the tab 30 via a serrated edge formed between the card 28 and the tab 30. In other embodiments still, the card 28 is removably secured to the tab 30 via a scalloped edge formed between the card 28 and the tab 30. In further embodiments, the card 28 is removably secured to the tab 30 via a perforated edge formed between the card 28 and the tab 30. In even further embodiments, the card 28 is removably secured to the tab 30 in some other suitable fashion. Such destructible edges (e.g., serrated edge, scalloped edge, perforated edge, scored edge, etc.) may form the common fold line 64 discussed above.

Figure 5:
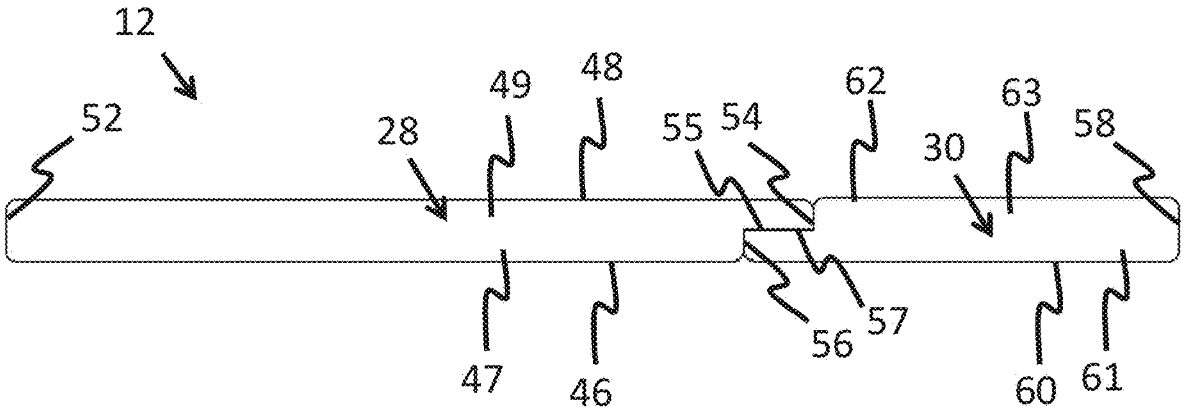
FIG. 5 is a side view of an inner carrier for a stored value card and carrier apparatus, according to other embodiments of the present disclosure.

Referring now to FIG. 5, the inner carrier 12 is shown, according to other embodiments of the present disclosure. As mentioned above, the second longitudinal edge 54 of the card 28 and the first longitudinal edge 56 of the tab 30 may be defined along the common fold line 64 formed in a single sheet of material. In other words, the second longitudinal edge 54 of the card 28 may be joined with the first longitudinal edge 56 of the tab 30. In some embodiments, a portion of the card 28 extends over the tab 30, and a portion of the tab 30 extends under such portion of the card 28 in order to interlock the card 28 and the tab 30 as shown. Accordingly, the second longitudinal edge 54 of the card 28 may be formed on an upper step portion 55 of the card 28, and the first longitudinal edge 56 of the tab 30 may form a lower step portion 57 of the tab 30. The upper step portion 55 may be removably joined with the lower step portion 57 in accordance with the destructible edges for the common fold line 64 discussed above with reference to FIG. 4.

Figure 6:
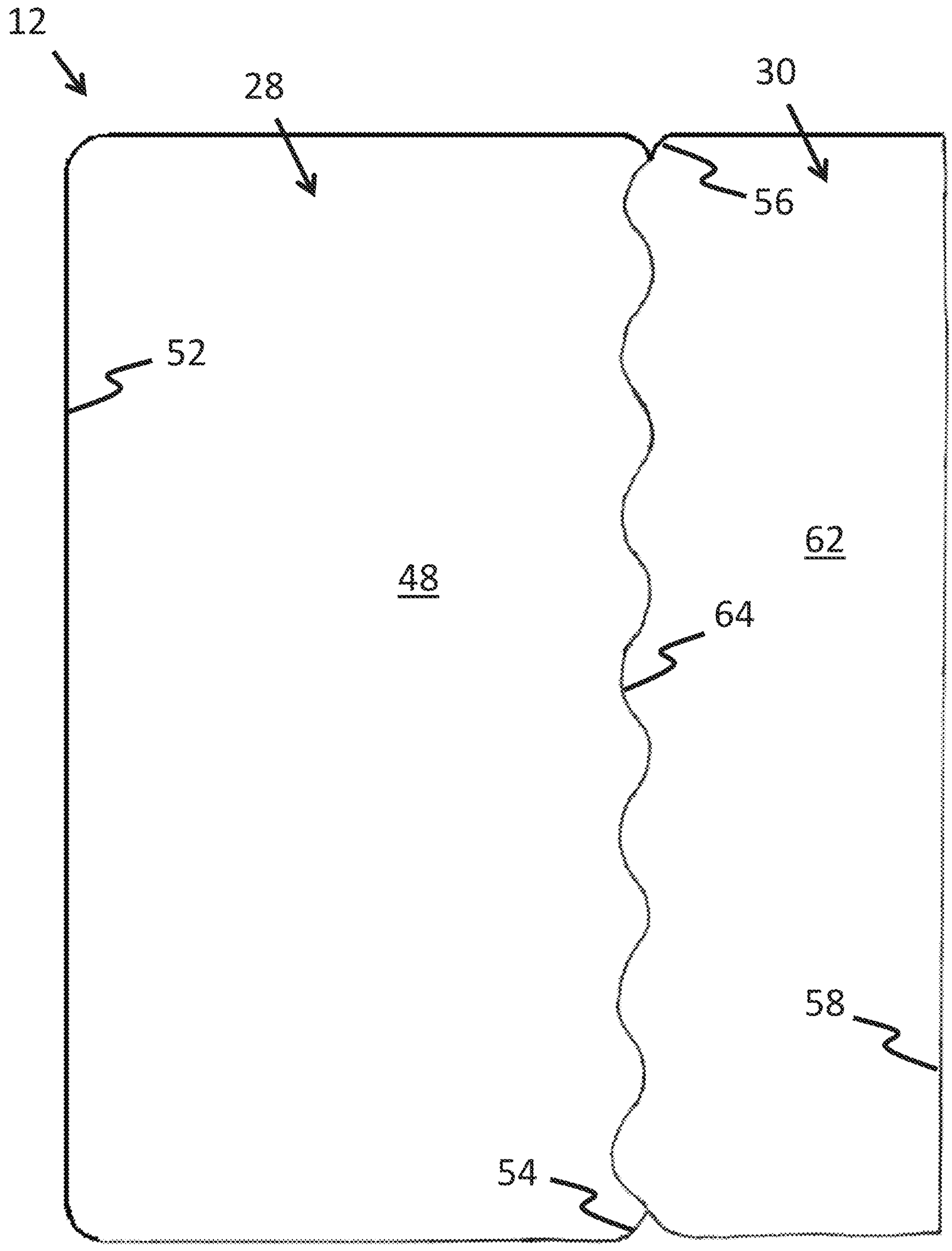
FIG. 6 is a top view of an inner carrier for a stored value card and carrier apparatus, according to other embodiments of the present disclosure.

Referring now to FIG. 6, the inner carrier 12 is shown, according to further embodiments of the present disclosure. As mentioned above with reference to FIGS. 4 and 5, various destructible edges may form the common fold line 64. In some embodiments, the common fold line 64 is straight. In other embodiments, and as shown, the common fold line 64 extends in an undulating fashion. It should be appreciated that the common fold line 64 may be provided in any suitable fashion (e.g., straight, curved, angular, undulating, zig-zag, continuous, dashed, etc.) suitable to provide the various destructible edges for the common fold line 64 discussed above.

Figure 7:
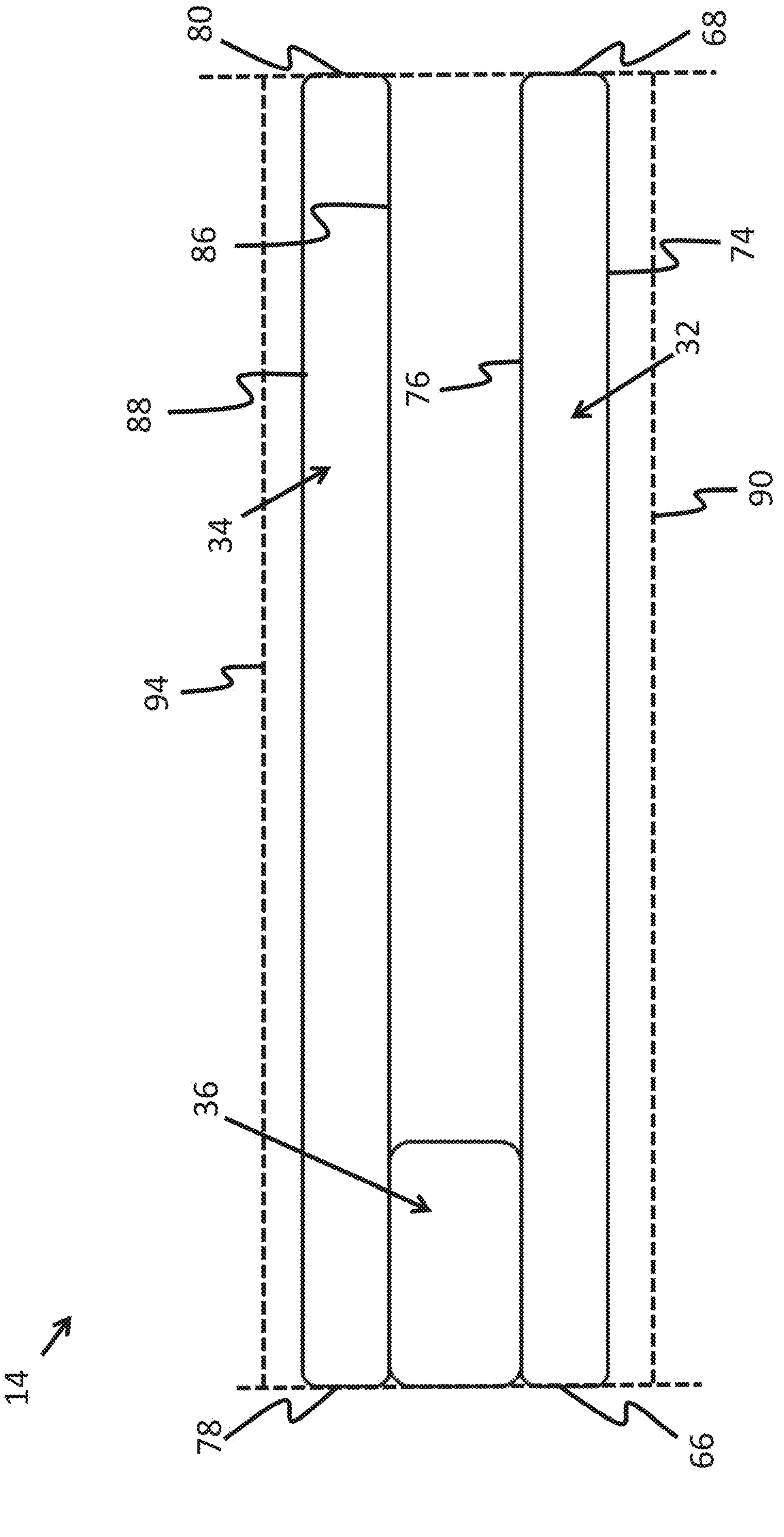
FIG. 7 is a side view of an outer carrier for a stored value card and carrier apparatus, according to some embodiments of the present disclosure.

Referring now to FIG. 7, the outer carrier 14 is shown in greater detail, according to some embodiments of the present disclosure. As mentioned above, the outer carrier 14 may include the first and second panels 32, 34. Furthermore, the outer carrier 14 may include the first permanent adhesive 36 fixing the first panel 32 to the second panel 34).

The first panel 32 may define a first longitudinal edge 66 at the closed end 16 of the outer carrier 14, a second longitudinal edge 68 at the open end 18 of the outer carrier 14, a first lateral edge 70 (shown with additional reference to FIG. 8), a second lateral edge 72, (shown with additional reference to FIG. 8), an outer surface (e.g., a first side, a lower side, etc.) 74, and further include (or otherwise form) the first inner surface 76. The second panel 34 may define a first longitudinal edge 78 at the closed end 16 of the outer carrier 14, a second longitudinal edge 80 at the open end 18 of the outer carrier 14, a first lateral edge 82 (shown with additional reference to FIG. 12), a second lateral edge 84 (shown with additional reference to FIG. 12), an outer surface (e.g., a second side, an upper side, etc.) 88, and further include (or otherwise form) the second inner surface 86. As mentioned above, the outer carrier 14 may further include the first permanent adhesive 36, which may fix the first panel 32 to the second panel 34, fix the first inner side 76 to the second inner side 86, or otherwise form the closed end 16 and/or the closed portion 24 discussed above.

The first panel 32 may include a height 90 (as measured along the longitudinal reference axis L depicted with reference to FIG. 1) extending from the first longitudinal edge 66 to the second longitudinal edge 68 and a width 92 (shown with additional reference to FIG. 8) extending from the first lateral edge 70 to the second lateral edge 72. The second panel 34 may include a height 94 (as measured along the longitudinal reference axis L depicted with reference to FIG. 1) extending from the first longitudinal edge 78 to the second longitudinal edge 80 and a width 96 (shown with additional reference to FIG. 12) extending from the first lateral edge 82 to the second lateral edge 84.

The height 90 of the first panel 32 may be greater than the width 92 of the first panel 32. The height 94 of the second panel 34 may be greater than the width 96 of the second panel 34. However, in other optional embodiments, the widths 92, 96 of the first and second panels 32, 34 may be greater than the heights 90, 94 of the first and second panels 32, 34, respectively.

Referring generally to FIGS. 8-12, a method of manufacturing a stored value card and carrier apparatus (such as the apparatus 10 discussed above) is shown, according to some embodiments of the present disclosure. Generally, the method may include (a) providing the aforementioned inner carrier 12; (b) vertically situating the inner carrier 12 in the slot 19 of the outer carrier 14 (e.g., vertically situating the inner carrier 12 above the first panel 32 and below the second panel 34, vertically situating the inner carrier 12 above the first inner side 76 and below the second inner side 86, etc.); (c) forming the closed end 16 of the outer carrier 14 (e.g., by fixing the first inner side 76 to the second inner side 86, such that the outer carrier 14 forms the open end 18 opposite the closed end 16); and (d) fixing the tab 30 to each of the first and second inner sides 76, 86. FIGS. 8-12 depict a ground-up assembly (e.g., starting with the first side 20 of the outer carrier 14 and moving upwards) of the apparatus 10 in order to depict a non-limiting example of the aforementioned method of manufacturing the apparatus 10.

Figure 8:
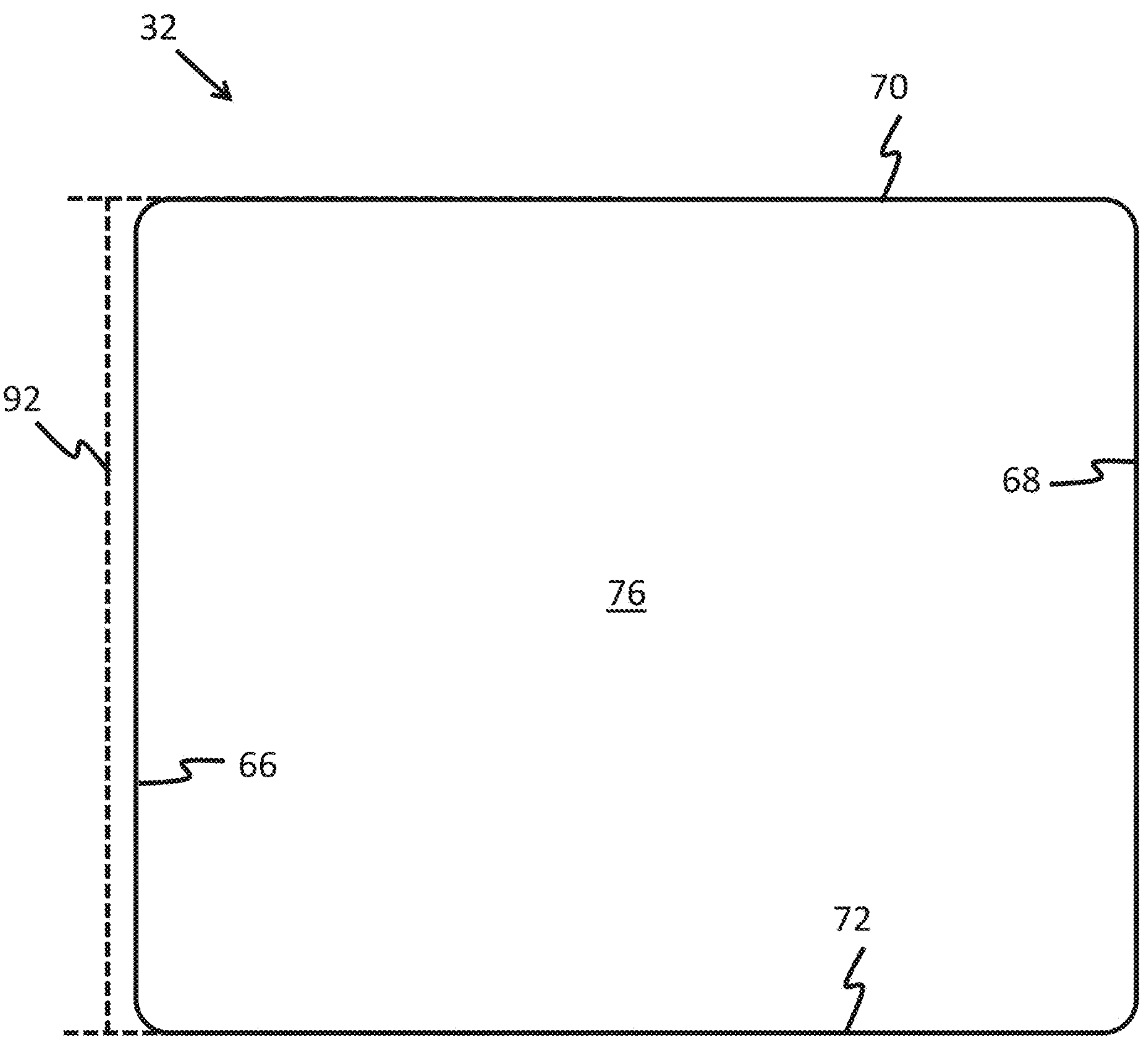
FIG. 8 is a top view of a first panel for an outer carrier of a stored value card and carrier apparatus, according to some embodiments of the present disclosure.

Referring now to FIG. 8, the method may include providing the first panel 32 of the outer carrier 14, according to some embodiments of the present disclosure. Of course, it should be appreciated that in some embodiments, the outer carrier 14 is provided as a single piece of material that forms the slot 19 as depicted with reference to FIG. 1.

Figure 9:
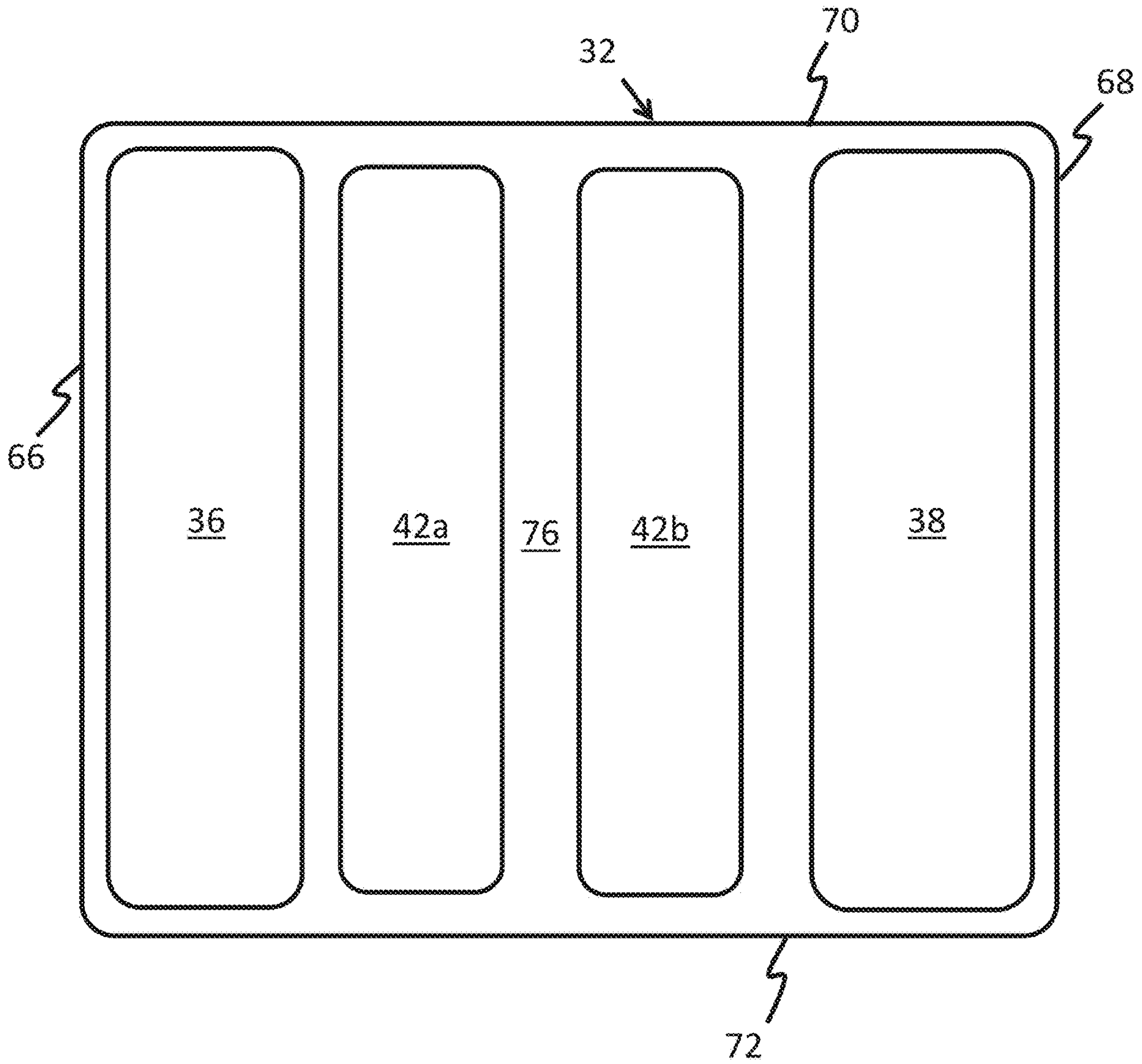
FIG. 9 is a top view of the first panel of FIG. 8 with adhesives disposed thereon, according to some embodiments of the present disclosure.

Referring now to FIG. 9, the method may include disposing the first permanent adhesive 36 on the first inner side 76 (e.g., on the first panel 32). For example, the first permanent adhesive 36 may be disposed on the first inner side 76 along the closed portion 24 of the outer carrier 14, or otherwise at the closed end 16 of the outer carrier 14.

The method may further include disposing the second permanent adhesive 38 on the first inner side 76 (e.g., on the first panel 32). For example, the second permanent adhesive 38 may be disposed on the first inner side 76 at the open end 18 of the outer carrier 14 on the open portion 26 of the outer carrier 14.

As discussed above, the first permanent adhesive 36 may be used to fix the first inner side 76 to the second inner side 86, thus forming the closed end 16 of the outer carrier 14; and the second permanent adhesive 38 may be used to fix the first inner side 76 to the tab 30 on the open end 18 of the outer carrier 14.

The method may further include disposing the first temporary adhesive 42 on the first inner side 76 (e.g., on the first panel 32). For example, the first temporary adhesive 42 may be disposed on the first inner side 76 in a longitudinal region of the open portion 26 of the outer carrier 14 between the closed portion 24 of the outer carrier 14 and the closed end 18 of the outer carrier 14 (where the tab second permanent adhesive 38 is positioned as discussed above). As noted above, the first temporary adhesive 42 may be used to removably adhere the card 28 to the first inner side 76 (e.g., to the first panel 32).

Figure 10:
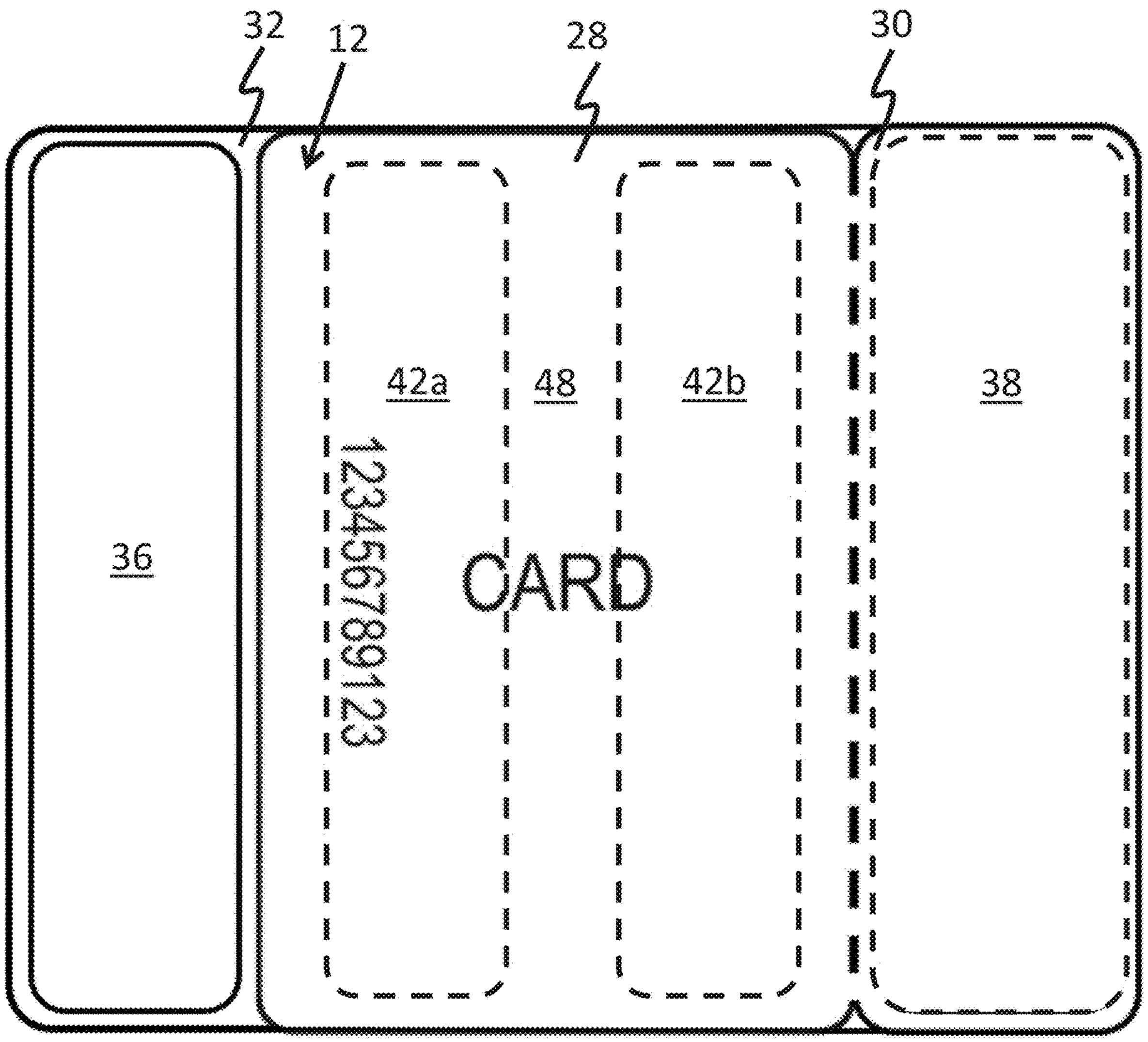
FIG. 10 is a top view of the first panel of FIG. 9 with an inner carrier disposed thereon, according to some embodiments of the present disclosure.

Referring now to FIG. 10, the method may further include disposing the inner carrier 12 on the second adhesive 38 and the third adhesive 40. In other words, the method may further include securing the inner carrier 12 to the first inner side 76 (e.g., the first panel 32) via the second permanent adhesive 40 and, in some cases, the first temporary adhesive 42. In particular, the card 28 of the inner carrier 12 may be disposed on the first temporary adhesive 42, and the tab 30 of the inner carrier 12 may be disposed on the second permanent adhesive 38. Accordingly, the card 28 may be removably secured to the first inner side 76 via the first temporary adhesive 42, while the tab 30 may be fixed to the first inner side 76 via the second permanent adhesive 38 at the open end 18 of the outer carrier 14.

Figure 11:
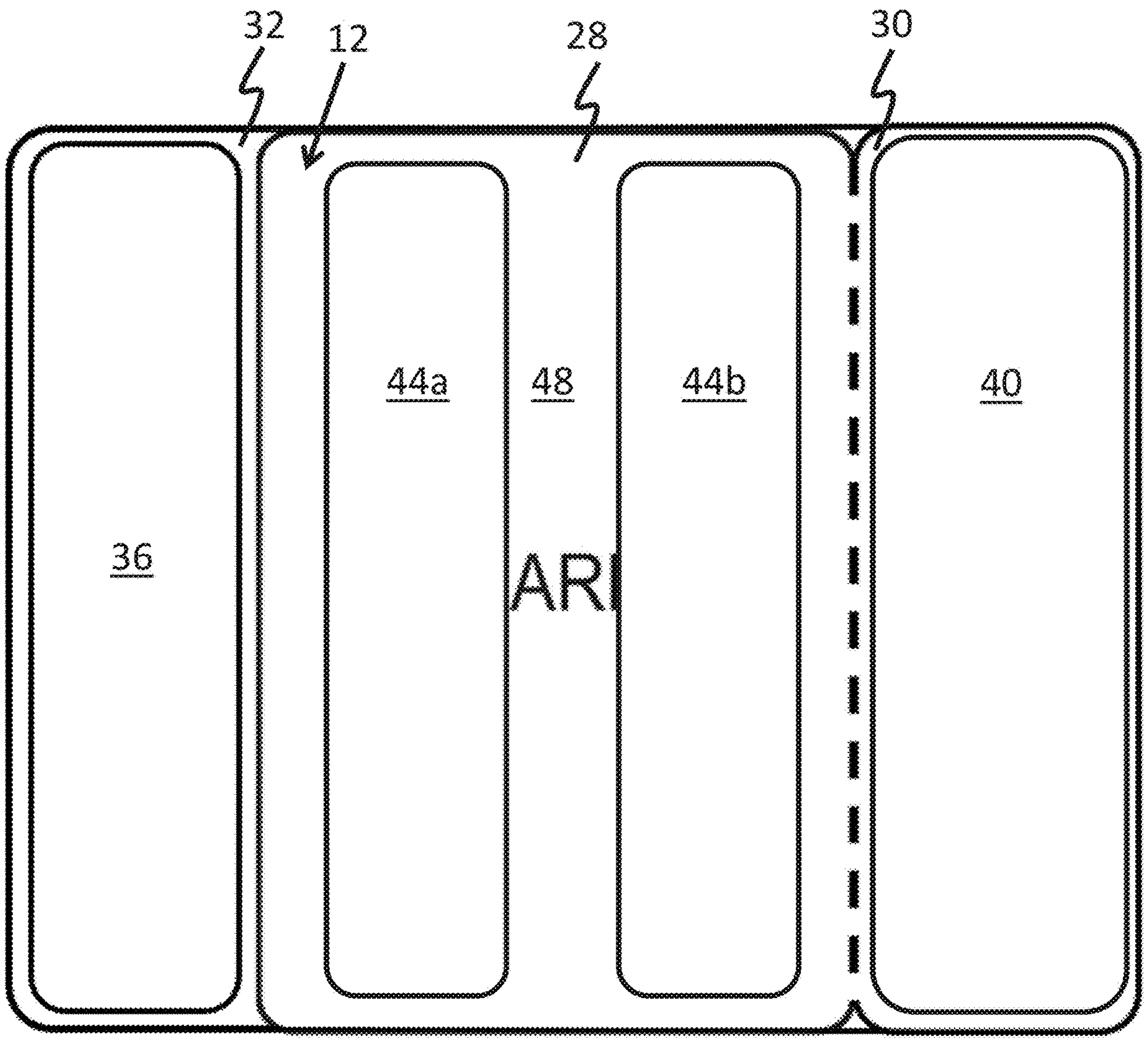
FIG. 11 is a top view of the first panel and inner carrier of FIG. 10 with additional adhesives disposed thereon, according to some embodiments of the present disclosure.

Referring now to FIG. 11, the method may further include disposing the second permanent adhesive 40 on the inner carrier 12 and, in some cases, the second temporary adhesive 44 on the inner carrier 12. In particular, the method may further include disposing the second permanent adhesive 40 on the tab 30 of the inner carrier 12, and the second temporary adhesive 44 on the card 28 of the inner carrier 12. As discussed above, the second permanent adhesive 40 may be used to fix the second inner side 86 (e.g., the second panel 34) to the tab 30 on the open end 18 of the outer carrier 14; and the second temporary adhesive 44 may be used to removably adhere the card 28 to the second inner side 86 (e.g., to the second panel 34).

Figure 12:
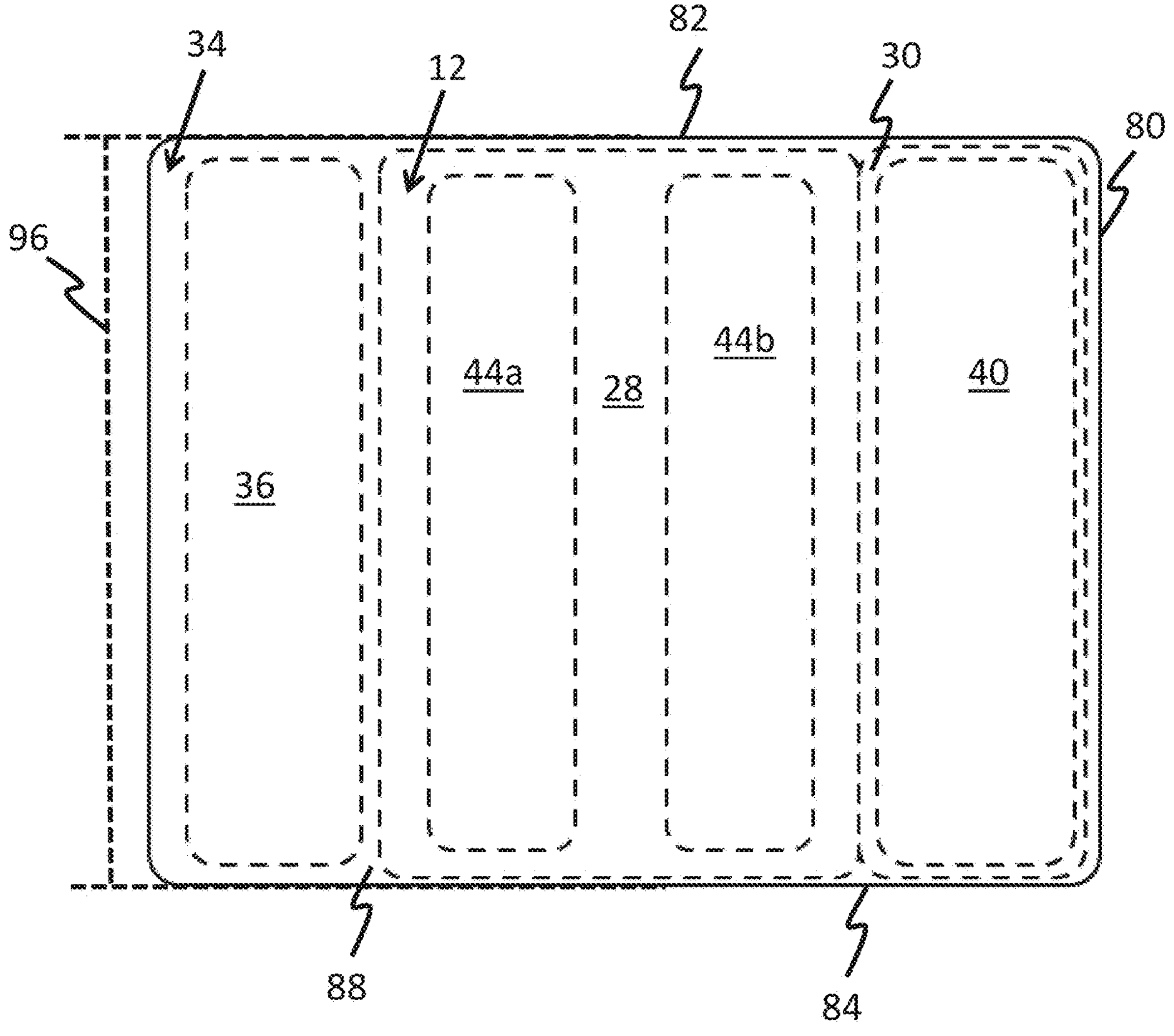
FIG. 12 is a top view of the first panel and inner carrier of FIG. 11 with a second panel disposed thereon, according to some embodiments of the present disclosure.

Referring now to FIG. 12, the method may further include disposing the second panel 34 on the first permanent adhesive 36, the third permanent adhesive 40, and, in some cases, the second temporary adhesive 44. Of course, as noted above, it should be appreciated that in some embodiments, the outer carrier 14 is provided as a single piece of material that forms the slot 19 as depicted with reference to FIG. 1.

Depending on the implementation, the second inner side 86 (e.g., the second panel 34) may be fixed to the first inner side 76 (e.g., the first panel 32) via the first permanent adhesive 36. Further, the second inner side 86 (e.g., the second panel 34) may be removably secured to the card 28 of the inner carrier 12 via the second temporary adhesive 42. Additionally, the second inner side 86 (e.g., the second panel 34) may be fixed to the tab 30 via the third permanent adhesive 40 (and the tab 30 may be fixed to the first inner side 76 via the second permanent adhesive 36). Accordingly, the inner carrier 12 may be covered on its lower and upper sides via the first and second panels 32, 34, or more generally be covered on its lower and upper sides by the outer carrier 14, and thus the one or more activation indicia 50 may be covered by the outer carrier 14.

As discussed above, it follows that the card 28 with the one or more activation indicia 50 displayed thereon may not be removed form the surrounding carrier material (e.g., the tab 30 and the outer carrier 14) without presenting visible sings of damage or destruction to such surrounding carrier material. Such damage or destruction may preferably serve as a visual indication that the apparatus 10 has been tampered with, thus identifying fraudster activity. While a fraudster may attempt to use an adhesive or tape to reconnect the outer carrier 14 to the inner carrier 12, the use of such adhesive or tape would be apparent to a consumer and indicate tampering. In some embodiments, the outer carrier 14 features a written instruction/warning that reads "Do not purchase if pull tab is removed."

Thus, one exemplary advantage of the present disclosure may be that a customer is able to identify when the stored value card and carrier apparatus 10 has been tampered with. In the embodiments discussed herein, the one or more activation indicia 50 is not viewable without destroying at least one element of the apparatus 10. The at least one element may include the first panel 32, the second panel 34, the tab 30, or any other portion of the apparatus 10. Another exemplary advantage of the present disclosure may be that a fraudster cannot re-assemble the apparatus 10 without it being visually detectable that the apparatus 10 has been tempered with. Moreover, the cashier of a retail store may further detect when the stored value card and carrier apparatus 10 has been tampered with.

Thus, although there have been described particular embodiments of the present invention of a new and useful STORED VALUE CARD AND CARRIER APPARATUSES AND METHODS, it is not intended that such references to particular embodiments be construed as limitations upon the scope of this invention.

What is claimed is:

1. A stored value card and carrier apparatus, comprising:

an outer carrier including a first panel and a second panel vertically disposed above the first panel, a first inner side of the first panel and a second inner side of the second panel fixed together at a closed end of the outer carrier, the outer carrier defining an open end longitudinally opposite the closed end; and an inner carrier vertically disposed between the first panel and the second panel, the inner carrier including a third panel longitudinally disposed on the open end and fixed to each of first inner side and the second inner side, the inner carrier further including a stored value card removably secured to the third panel and longitudinally extending away from the third panel towards the closed end, the stored value card having one or more activation indicia displayed thereon and covered by the outer carrier.

2. The apparatus of claim 1, wherein the first inner side is fixed to the second inner side via a first permanent adhesive.

3. The apparatus of claim 2, wherein the third panel is fixed to the first inner side via a second permanent adhesive, and wherein the third panel is fixed to the second inner side via a third permanent adhesive.

4. The apparatus of claim 3, wherein the stored value card is removably secured to the third panel via a scored edge formed between the stored value card and the third panel.

5. The apparatus of claim 4, wherein the stored value card is removably adhered to the first inner side via a first temporary adhesive.

6. The apparatus of claim 4, wherein the stored value card is removably adhered to the second inner side via a second temporary adhesive.

7. The apparatus of claim 4, wherein the stored value card is removably adhered to the first inner side via a first temporary adhesive, and wherein the stored value card is removably adhered to the second inner side via a second temporary adhesive.

8. A method of manufacturing a stored value card and carrier apparatus, comprising:

providing an inner carrier including a stored value card having one or more activation indicia displayed thereon;

vertically situating the inner carrier above a first panel of an outer carrier and below a second panel of the outer carrier;

forming a closed end of the outer carrier by fixing a first inner side of the first panel to a second inner side of the second panel, such that the outer carrier forms an open end longitudinally opposite the closed end; and fixing a third panel of the inner carrier to each of the first inner side and the second inner side at the open end, the third panel removably secured to the stored value card such that the stored value card longitudinally extends away from the third panel towards the closed end and the one or more activation indicia are covered by the outer carrier.

9. The method of claim 8, wherein the first inner side is fixed to the second inner side via a first permanent adhesive.

10. The method of claim 9, wherein the third panel is fixed to the first inner side via a second permanent adhesive, and wherein the third panel is fixed to the second inner side via a third permanent adhesive.

11. The method of claim 10, wherein the stored value card is removably secured to the third panel via a scored edge formed between the stored value card and the third panel.

12. The method of claim 11, further comprising removably adhering the stored value card to the first inner side via a first temporary adhesive.

13. The method of claim 11, further comprising removably adhering the stored value card to the second inner side via a second temporary adhesive.

14. The method of claim 11, further comprising:

removably adhering the stored value card to the first inner side via a first temporary adhesive; and removably adhering the stored value card to the second inner side via a second temporary adhesive.

15. A stored value card and carrier apparatus, comprising:

an outer carrier including a closed end and an open end, such that a slot is defined between the closed end and the open end; and an inner carrier disposed in the slot, the inner carrier including a tab fixed to the open end, the inner carrier further including a stored value card removably secured to the tab and longitudinally extending away from the tab towards the closed end, the stored value card having one or more activation indicia displayed thereon and covered by the outer carrier.

16. The apparatus of claim 15, wherein the outer carrier includes a first inner side and a second inner side, and wherein the tab is fixed to each of the first inner side and the second inner side at the closed end.

17. The apparatus of claim 16, wherein the stored value card is removably secured to the tab via a scored edge formed between the stored value card and the tab.

18. The apparatus of claim 17, wherein the stored value card is removably adhered to the first inner side via a first temporary adhesive.

19. The apparatus of claim 17, wherein the stored value card is removably adhered to the second inner side via a second temporary adhesive.

20. The apparatus of claim 17, wherein the stored value card is removably adhered to the first inner side via a first temporary adhesive, and wherein the stored value card is removably adhered to the second inner side via a second temporary adhesive.

* * * * *